United States Patent
Waki et al.

(10) Patent No.: US 7,118,816 B2
(45) Date of Patent: Oct. 10, 2006

(54) MAGNETIC RECORDING MEDIUM

(75) Inventors: Koukichi Waki, Kanagawa (JP); Yasushi Hattori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 128 days.

(21) Appl. No.: 10/421,842

(22) Filed: Apr. 24, 2003

(65) Prior Publication Data

US 2003/0203242 A1    Oct. 30, 2003

(30) Foreign Application Priority Data

Apr. 25, 2002  (JP) ............... 2002-123598
Apr. 10, 2003  (JP) ............... 2003-106164

(51) Int. Cl.
  G11B 5/66  (2006.01)
  G11B 5/70  (2006.01)

(52) U.S. Cl. ................................ 428/842.3

(58) Field of Classification Search ........... 428/694 T, 428/694 TR, 694 BR, 336, 900, 842.3, 842.2, 428/842.4, 844.5
See application file for complete search history.

(56) References Cited

U.S. PATENT DOCUMENTS 5,795,642 A     8/1998  Ishikawa et al.
5,815,343 A *   9/1998  Ishikawa et al. ......... 360/97.01
6,057,021 A *   5/2000  Ishikawa et al. ........... 428/65.3
6,420,058 B1*   7/2002  Haratani et al. ......... 428/694 T
6,602,620 B1*   8/2003  Kikitsu et al. .......... 428/694 T
6,623,857 B1*   9/2003  Watanabe et al. .......... 428/402
2003/0215675 A1* 11/2003 Inaba et al. ........... 428/694 TP

FOREIGN PATENT DOCUMENTS

| EP | 0 602 533 A1 | 6/1994 |
| EP | 0 977 182 A2 | 2/2000 |
| EP | 1 063 638 A1 | 12/2000 |
| EP | 1 109 159 A1 | 6/2001 |
| EP | 1 207 522 A1 | 5/2002 |
| WO | WO 00/44507 A1 | 8/2000 |

OTHER PUBLICATIONS

European Search Report.

* cited by examiner

Primary Examiner—Holly Rickman
(74) Attorney, Agent, or Firm—Sughrue Mion, PLLC

(57) ABSTRACT

The present invention provides a magnetic recording medium comprising a support and a magnetic layer comprising a CuAu type or $Cu_3Au$ type magnetically hard ordered alloy phase, wherein a center line average roughness of a magnetic layer surface is 0.1 to 5 nm at a cut-off value of 0.25 mm, and a magnetic recording medium comprising a support and a magnetic layer containing, in a nonmagnetic metal oxide matrix, metal nanoparticles having a CuAu type or $Cu_3Au$ type magnetically hard ordered alloy phase.

7 Claims, No Drawings

MAGNETIC RECORDING MEDIUM

BACKGROUND OF THE INVENTION

1. Field of the Invention

The present invention relates to a magnetic recording medium and, particularly, to a magnetic recording medium provided with a magnetic layer containing metal nanoparticles having hard magnetism.

2. Description of the Related Art

In order to improve magnetic recording density, it is necessary to decrease a particle size of a magnetic substance contained in a magnetic layer. For example, when a magnetic recording medium widely used as a video tape, a computer tape or a disk is compared with another one having a ferromagnetic body of the same weight, the smaller the particle size is, the lower the level of noise is.

CuAu type or $Cu_3Au$ type magnetically hard ordered alloys (superlattice type magnet) have large magnetic anisotropy of crystal due to the strain produced when these alloys are ordered and therefore have hard magnetism even when a particle size thereof is decreased to prepare so-called metal nanoparticles. These alloys are therefore promising materials for improving magnetic recording density.

Examples of a method of synthesizing metal nanoparticles which can form CuAu type or $Cu_3Au$ type alloys include (1) an alcohol reduction method using a primary alcohol, (2) a polyol reduction method using a secondary, tertiary, dihydric or trihydric alcohol, (3) a thermal decomposition method, (4) an ultrasonic decomposition method, (5) a reduction method using a strong reducing agent, and the like when classified according to precipitation methods (for example, Japanese Patent Application Laid-Open (JP-A) No. 2003-73705).

Also, when classified according to reaction systems, examples of a method of synthesizing metal nanoparticles which can form CuAu type or $Cu_3Au$ type alloys include (6) a polymer existence method, (7) a high-boiling point solvent method, (8) a normal micelle method, (9) a reverse micelle method and the like.

The metal nanoparticles synthesized by the above-described methods have a face-centered cubic crystal structure. A face-centered cubic crystal generally has soft magnetism or paramagnetism. Crystals having soft magnetism or paramagnetism are not suitable for recording media. In order to obtain a magnetically hard ordered alloy having a coercive force of at least 95.5 kA/m (1200 Oe) necessary for a magnetic recording medium, annealing treatment must be performed at a temperature equal to or higher than a transformation temperature at which the nanoparticles are transformed from a disordered phase to an ordered phase.

Metal nanoparticles prepared by a liquid phase method are generally dispersed in a liquid with an organic dispersant or a polymer. When the dispersion including the nanoparticles is applied to a support and the coating layer is heated at a temperature equal to or higher than the transformation temperature in an inert gas to form a magnetic layer, the metal nanoparticles become magnetically hard, whereas the organic dispersant and the polymer are carbonized. Although this carbonization is desirable to make the magnetization among metal nanoparticles independent, it is undesirable for keeping high adhesion between the support and the magnetic layer and high film strength of the magnetic layer. Specifically, the magnetic layer in which the organic dispersant and the polymer are carbonized is easily peeled off and a surface of the magnetic layer is easily scratched.

SUMMARY OF THE INVENTION

In view of these problems, an object of the present invention is to provide a magnetic recording medium which has hard magnetism and is provided with a magnetic layer having high film strength and high adhesion to a support.

The inventors of the invention have made earnest studies to solve the above-described problems and, as a result, found that these problems can be solved by the invention described below.

A first aspect of the invention provides a magnetic recording medium comprising a support and a magnetic layer comprising a CuAu type or $Cu_3Au$ type magnetically hard ordered alloy phase, wherein a center line average roughness of a magnetic layer surface is 0.1 to 5 nm at a cut-off value of 0.25 mm.

A second aspect of the invention provides a magnetic recording medium comprising a support and a magnetic layer containing, in a nonmagnetic metal oxide matrix, metal nanoparticles having a CuAu type or $Cu_3Au$ type magnetically hard ordered alloy phase.

Since the metal oxide matrix is nonmagnetic, metal nanoparticles having a single magnetic domain structure are prevented from contacting with each other, thus reducing transition noise at the time of magnetic recording.

DETAILED DESCRIPTION OF THE PREFERRED EMBODIMENTS

First Magnetic Recording Medium

A first magnetic recording medium of the present invention has a support and a magnetic layer comprising a CuAu or $Cu_3Au$ type magnetically hard ordered alloy phase, and a center line average roughness of a magnetic layer surface is 0.1 to 5 nm at a cut-off value of 0.25 mm. When the center line average roughness is less than 0.1 nm, a coefficient of friction between a head and the magnetic recording medium is large and therefore the magnetic recording medium adheres to the head, and such a situation is not acceptable for practical purposes. When the coefficient exceeds 5 nm, a loss of space increases, thereby lowering output.

The center line average roughness (Ra) of the magnetic layer surface of the magnetic recording medium of the invention is 0.1 to 5 nm at a cut-off value of 0.25 mm. Since it is preferable that a magnetic recording medium for high density recording has an extremely smooth surface, Ra is preferably in the range of 0.1 to 4 nm.

Ra is preferably 0.1 to 1 nm and more preferably 0.3 to 0.8 nm in order to use the magnetic recording medium of the invention as a hard disc. When Ra exceeds 1 nm, a flying head may not be floated, breaking the head on the surface of the medium. When Ra is less than 0.1 nm and a malfunction occurs such that rotation of the medium which is brought into contact with the head is stopped, the head may adhere to the surface of the medium, interfering with rotation of the medium.

When the magnetic recording medium of the invention is a flexible medium such as a flexible disc or a tape, it is used in a recording system in which the magnetic recording medium is conveyed while being brought into contact with a head. Therefore, when the surface of the medium is too smooth, the coefficient of friction is high and the medium may adhere to the head. Accordingly, Ra is preferably 1 to 4 nm, and more preferably 2 to 3 nm. When Ra is too large, an effective distance between the head and the medium becomes large and good electromagnetic conversion characteristics may not be obtained.

In order to smooth the surface of a magnetic layer, it is effective that the magnetic layer contains a matrix agent as in a second magnetic recording medium which will be explained below. Further, it is preferable to carry out calendering treatment after coating the magnetic layer. Furthermore, a burnish treatment may be carried out in order to remove fine surface projections or dust.

When the magnetic recording medium of the invention is used as a hard disc and burnished by a burnish head, it is preferable that the surface before burnishing is at least to some extent smooth. When the surface is not smooth, a burnish head cannot be floated, and may be crushed on the surface of the medium.

Whether surface projections exist can be examined by a glide head having a strain gauge, after burnishing.

Among floating quantities of a burnish head, a glide head and a head which can perform electromagnetic conversion, that of the burnish head is the smallest, and that of the glide head is next smallest. The floating quantity of the burnish head is preferably 5 to 15 nm, and more preferably 10 to 12 nm. Further, the floating quantity of the glide head is usually about 12 nm.

Further, a load at the time of burnishing is preferably 3 to 12 g, and more preferably 3 to 6 g.

The surface projections of the magnetic recording medium of the invention can be evaluated with the glide head. When the projections exist on the magnetic layer surface, they strike the head which can perform electromagnetic conversion and become worn. The resultant pieces of the projections adhere to the head and fill a head gap, and an electromagnetic conversion characteristic cannot be evaluated. Therefore, it is preferable that the surface of the magnetic recording medium has no projections. However, surface projections can be removed at the time of evaluation with the glide head. A number of surface projections having a height of at least 12 nm is preferably 5 or less, more preferably 3 or less and ideally 0. The medium surface having many projections is not preferable industrially, since the glide head is easily contaminated, resulting in the need for frequent cleaning or replacement of the glide head.

Second Magnetic Recording Medium

The second magnetic recording medium has a support and a magnetic layer containing, in a nonmagnetic metal oxide matrix, metal nanoparticles having a CuAu type or $Cu_3Au$ type magnetically hard ordered alloy phase.

Anti-scratching properties of the magnetic layer and adhesion between the magnetic layer and the support can be improved by using the magnetic layer containing the above-described metal nanoparticles in the nonmagnetic metal oxide matrix.

Namely, since the metal oxide matrix functions as a binder, strong adhesion between the magnetic layer and the support can be maintained even when annealing treatment for ordering the metal nanoparticles is carried out. Also, because a structure of the metal oxide matrix is not changed and a firm magnetic layer is formed even when annealing treatment is carried out, a reduction in film strength which is caused when a magnetic layer containing an organic dispersant and a polymer is annealed is prevented, and thus the anti-scratching properties of the magnetic recording medium can be improved.

Moreover, since the metal nanoparticles contained in the metal oxide matrix do not aggregate and a state in which the metal nanoparticles are completely dispersed can be maintained, the hard magnetism of the metal nanoparticles can be put to good effect.

The nonmagnetic metal oxide matrix preferably comprises at least one matrix agent selected from silica, titania and polysiloxane. Specifically, it is more preferable that the metal oxide matrix comprises at least one matrix agent selected from an organosilica sol (e.g., Silica Sol manufactured by Nissan Chemical Industries, Ltd. and Nanotech $SiO_2$ manufactured by C. I. Kasei Co., Ltd.), organotitania sol (e.g., Nanotech $TiO_2$ manufactured by C. I. Kasei Co., Ltd.) and silicone resin (e.g., Torefil R910 manufactured by Toray Industries, Inc.).

The above-described material is particularly effective to improve the anti-scratching properties and the adhesion of the magnetic layer.

Any known additive can be used together with the metal oxide matrix as long as the foregoing matrix agent is used as a major component.

An amount of the matrix agent added is 1 to 50% by volume, preferably 2 to 30% by volume, more preferably 3 to 20% by volume, and still more preferably 5 to 20% by volume based on a total volume of the metal nanoparticles. This is because when the amount of matrix agent added is inadequate, the effect of smoothing the surface is insufficient, and when the amount of the matrix agent is excessive, the fill factor in the magnetic substance deteriorates and therefore good electromagnetic conversion characteristics cannot be obtained.

As in the first magnetic recording medium, it is also preferable that the second magnetic recording medium has a center line average roughness of the magnetic layer within a range of 0.1 to 5 nm when a cut-off value is 0.25 mm. Further, the surface of the magnetic layer is preferably burnished. A number of the projections having a height of at least 12 nm which are formed on the magnetic layer surface is preferably 5 or less. Preferable ranges of Ra, a number of the projections, conditions under which burnishing is carried out, and the like are similar to those in the first magnetic recording medium.

The magnetic recording medium of the invention (which hereinafter means the first magnetic recording medium and the second magnetic recording medium in some cases.) may be used as a video tape, a computer tape, a flexible disc, a hard disc, or an MRAM.

The metal nanoparticles contained in the magnetic layer of the magnetic recording medium of the invention have a CuAu type or $Cu_3Au$ type magnetically hard ordered alloy phase. Because such an alloy phase has hard magnetism, it is preferably used in the magnetic recording medium.

Examples of the CuAu type ferromagnetic ordered alloy include FeNi, FePd, FePt, CoPt and CoAu. Among these alloys, FePd, FePt and CoPt are preferable.

Examples of the $Cu_3Au$ type ferromagnetic ordered alloy include $Ni_3Fe$, $FePd_3$, $Fe_3Pt$, $FePt_3$, $CoPt_3$, $Ni_3Pt$, $CrPt_3$ and $Ni_3Mn$. Among these alloys, $FePd_3$, $FePt_3$, $CoPt_3$, $Fe_3Pd$, $Fe_3Pt$ and $Co_3Pt$ are preferable.

A coercive force of the annealed or ordered metal nanoparticles is preferably 95.5 to 636.8 kA/m (1,200 to 8,000 Oe) and, in order to enable the magnetic recording medium using the nanoparticles to correspond to a recording head, more preferably 95.5 to 398 kA/m (1,200 to 5,000 Oe).

The metal nanoparticles may be produced by a vapor phase method or a liquid phase method. Any known liquid phase method may be used, but a reverse micelle method or a reduction method which is an improved modification of the known method is preferably used.

Reverse Micelle Method

The reverse micelle method includes at least (1) a reduction step of mixing two reverse micelle solutions to carry out a reduction reaction and (2) a ripening step of ripening the resulting solution at a predetermined temperature. Each step will be explained below.

(1) Reduction Step:

First of all, a water-insoluble organic solvent containing a surfactant is mixed with an aqueous solution of a reducing agent to prepare a reverse micelle solution (I).

An oil-soluble surfactant is used as the above-described surfactant. Specific examples of the oil-soluble surfactant include sulfonates (e.g., Aerosol OT (manufactured by Wako Pure Chemical Industries, Ltd.)), quaternary ammonium salts (e.g., cetyl trimethyl ammonium bromide) and ethers (e.g., pentaethylene glycol dodecyl ether).

An amount of the surfactant in the water-insoluble organic solvent is preferably 20 to 200 g/l.

Preferable examples of the water-insoluble organic solvent which dissolves the surfactant include alkanes, ethers and alcohols.

As the alkane, those having 7 to 12 carbon atoms are preferable. Specifically, heptane, octane, isooctane, nonane, decane, undecane, dodecane and the like are preferable.

As the ether, diethyl ether, dipropyl ether, dibutyl ether and the like are preferable.

As the alcohol, ethoxyethanol, ethoxypropanol and the like are preferable.

Examples of the reducing agent in the aqueous solution include alcohols; polyalcohols; $H_2$; and compounds containing HCHO, $S_2O_6^{2-}$, $H_2PO_2^-$, $BH_4^-$, $N_2H_5^+$, $H_2PO_3^-$ and the like and may be used alone or in combination.

An amount of the reducing agent in the aqueous solution is preferably 3 to 50 mol based on one mol of the metal salt.

A mass ratio (water/surfactant) of water to the surfactant in the reverse micelle solution (I) is preferably set at 20 or less. When the mass ratio exceeds 20, components contained in the reverse micelle solution (I) easily precipitate and particle sizes tend to become uneven. The mass ratio is more preferably 15 or less and still more preferably 0.5 to 10.

A reverse micelle solution (II) is separately prepared by mixing a water-insoluble organic solvent containing a surfactant with an aqueous solution of metal salts.

The same surfactant and water-insoluble organic solvent as those of the reverse micelle solution (I) may be used in the reverse micelle solution (II). Preferable ranges of concentrations of the surfactant and the water-insoluble organic solvent in the reverse micelle solution (II) are the same as those in the reverse micelle solution (I).

The surfactant and the water-insoluble organic solvent used in the reverse micelle solution (II) may be the same as or different from those used in the reverse micelle solution (I). A preferable range of a mass ratio of water to the surfactant in the reverse micelle solution (II) is the same as that in the reverse micelle solution (I), and the mass ratio in the reverse micelle solution (II) may be the same as or different from that in the reverse micelle solution (I).

It is preferable that the metal salts to be contained in the aqueous metal salt solution are selected such that the metal nanoparticles to be produced can form a CuAu type or $Cu_3Au$ type ferromagnetic ordered alloy.

Specific examples of the metal salts include $H_2PtCl_6$, $K_2PtCl_4$, $Pt(CH_3COCHCOCH_3)_2$, $Na_2PdCl_4$, $Pd(OCOCH_3)_2$, $PdCl_2$, $Pd(CH_3COCHCOCH_3)_2$, $HAuCl_4$, $Fe_2(SO_4)_3$, $Fe(NO_3)_3$, $(NH_4)_3Fe(C_2O_4)_3$, $Fe(CH_3COCHCOCH_3)_3$, $NiSo_4$, $CoCl_2$ and $Co(OCOCH_3)_2$.

A concentration of the metal salts in the aqueous metal salt solution is preferably 0.1 to 2,000 μmol/ml, more preferably 1 to 1,000 μmol/ml, still more preferably 1 to 500 μmol/ml and particularly preferably 1 to 100 μmol/ml.

Proper selection of the metal salts ensures the production of metal nanoparticles which can form a CuAu type or $Cu_3Au$ type ferromagnetic ordered alloy comprising a base metal and a precious metal.

It is necessary to transform the alloy phase from a disordered phase to an ordered phase by annealing the metal nanoparticles. In order to lower the transformation temperature, it is preferable to add to the binary alloy a third element such as Sb, Pb, Bi, Cu, Ag, Zn or In. The addition of the third element is preferably attained by adding a precursor of the third element in advance to the metal salt solution. An amount of the third element added is preferably 1 to 30 at % and more preferably 5 to 20 at % based on the binary alloy.

These reverse micelle solutions (I) and (II) prepared in the above-described manners are mixed with each other. No particular limitation is imposed on a mixing method. However, it is preferable to mix both solutions by adding the reverse micelle solution (II) to the reverse micelle solution (I) while the reverse micelle solution (I) is being stirred from a standpoint of the uniformity of reduction. After mixing is completed, a reduction reaction is effected. A temperature at this time is preferably constant within a range from −5 to 30° C.

When the reduction temperature is less than −5° C., the aqueous phase is condensed, and, as a result, the reduction reaction is carried out unevenly. When the reduction temperature exceeds 30° C., components contained in the mixture easily flocculate or precipitate, and, as a result, the system becomes unstable. A reduction temperature is preferably 0 to 25° C. and more preferably 5 to 25° C.

The aforementioned term "constant temperature" means that when a setting temperature is T (° C.), a real temperature falls within a range of T±3° C. In this case, it is necessary that upper and lower limits of the temperatures fall within the above-described reduction temperature range (−5 to 30° C.).

Although it is necessary that a reduction reaction time is properly set according to, for example, amounts of the reverse micelle solutions, the reduction reaction time is preferably 1 to 30 minutes and more preferably 5 to 20 minutes.

The reduction reaction largely affects mono-dispersibility in the distribution of particles and therefore it is preferable to carry out the reduction reaction at as high a speed as possible while the reaction system is being stirred.

In order to stir the reaction system, a stirrer having high shearing force, specifically, a stirrer which has a stirring wing basically having a turbine type or puddle type structure, and in which a sharp blade is attached to the end of the wing or at a position which is in contact with the wing and in which the wing is rotated by a motor is preferably used. Dissolver (manufactured by Tokushu Kika Kogyo Co., Ltd.). Omni Mixer (manufactured by Yamato Scientific Co., Ltd.), Homogenizer (manufactured by SMT) and the like are useful as such. The use of any of these stirrers makes it possible to synthesize mono-disperse metal nanoparticles in the form of a stable liquid dispersion.

It is preferable to add at least one dispersant having one to three amino groups or carboxy groups to at least one of the reverse micelle solutions (I) and (II) in an amount of 0.001 to 10 mol per mol of the metal nanoparticles to be produced.

The addition of such a dispersant enables metal nanoparticles which are more monodisperse and free from flocculation to be prepared.

When the amount of the dispersant is less than 0.001, improvement in the monodispersibility of the metal nanoparticles may be diminished, whereas when the amount exceeds 10 mol, flocculation might take place.

An organic compound having a group adhering to the surface of the metal nanoparticles is preferable as the above-described dispersant. Specific examples of such a compound include organic compounds having one to three amino groups, carboxy groups, sulfonate groups or sulfinate groups, and these organic compounds may be used alone or in combination.

These organic compounds are represented by the following structures: R—$NH_2$, $NH_2$—R—$NH_2$, $NH_2$—R($NH_2$)—$NH_2$, R—COOH, COOH—R—COOH, COOH—R(COOH)—COOH, R—$SO_3H$, $SO_3H$—R—$SO_3H$, $SO_3H$—R($SO_3H$)—$SO_3H$, R—$SO_2H$, $SO_2H$—R—$SO_2H$ and $SO_2H$—R($SO_2H$)—$SO_2H$, and R represents a linear, branched or cyclic saturated or unsaturated hydrocarbon.

The dispersant is particularly preferably oleic acid. Oleic acid is well-known as a surfactant for stabilizing a colloid and has been used to protect iron nanoparticles. The relatively long chain of oleic acid (for instance, oleic acid has a chain of 18 carbon atoms and a length of up to 20 angstroms (up to 2 nm) and oleic acid is not an aliphatic compound and has one double bond) provides an important steric hindrance offsetting a strong magnetic interaction between particles.

Long-chain carboxylic acids similar to oleic acid, such as erucic acid and linoleic acid are also preferably used (for instance, long-chain organic acids having 8 to 22 carbon atoms may be used alone or in combination). Oleic acid (e.g., olive oil) is an easily available and inexpensive natural resource and is therefore preferably used. Oleylamine derived from oleic acid is also a useful dispersant.

It is considered that the reduction reaction proceeds as follows. In the above-described reduction step, a metal which has a low redox potential (a metal having a redox potential of −0.2 V (vs. N.H.E) or less), such as Co, Fe, Ni and Cr, and is contained in the CuAu type or $Cu_3Au$ type magnetically hard ordered alloy phase is reduced and precipitates in the form of particles which have a minimum size and are monodisperse. Thereafter, in a heating stage and in a ripening step which will be explained later, the precipitated base metal serves as a core and a metal which has a higher redox potential (a metal having a redox potential of −0.2 V (vs. N.H.E) or more) such as Pt, Pd and Rh is reduced by the base metal on the core surface, so that the precious metal replaces the base metal and precipitates. The ionized base metal is reduced again by the reducing agent and precipitates. These reactions are repeated, whereby metal nanoparticles capable of forming a CuAu type or $Cu_3Au$ type magnetically hard ordered alloy are obtained.

(2) Ripening Step:

The reaction solution in which the reduction reaction has been completed is heated to a temperature necessary for ripening.

The ripening temperature is preferably constant within a range from 30 to 90° C. and is set at a temperature higher than the reduction reaction temperature. Also, the ripening time is preferably set at 5 to 180 minutes. When the ripening temperature is higher than 90° C. and/or the ripening time is longer than 180 minutes, flocculation or precipitation easily occurs. On the other hand, when the ripening temperature is lower than 30° C. and/or the ripening time is shorter than 5 minutes, the solution cannot be ripened sufficiently, resulting in nanoparticles which have an undesired composition. The ripening temperature is preferably 40 to 80° C. and more preferably 40 to 70° C. and the ripening time is preferably 10 to 150 minutes and more preferably 20 to 120 minutes.

The aforementioned term "constant temperature" means that when a setting temperature is T (° C.), a real temperature falls within a range of T±3° C. In this case, it is necessary that upper and lower limits of the temperatures fall within the above-described ripening temperature range (30 to 90° C.). It is preferable that the ripening temperature is not only within the above-described range (30 to 90° C.) and but also exceeds the reduction reaction temperature by at least 5° C. The ripening temperature more preferably exceeds the reduction reaction temperature by at least 10° C. When the difference between the ripening temperature and the reduction temperature is less than 5° C., nanoparticles having a desired composition might not be obtained.

In the above-described ripening step, the precious metal precipitates on the base metal which has been reduced and has precipitated in the reduction step.

Namely, the precious metal is reduced only on the base metal and the base metal and the precious metal do not precipitate separately. Therefore, it is possible to produce metal nanoparticles capable of forming a CuAu type or $Cu_3Au$ type magnetically hard ordered alloy having a desired composition with a high yield in accordance with a prescription, and a composition of the metal nanoparticles can be controlled. Also, the particle diameter of the resulting metal nanoparticles can be controlled by appropriately adjusting a temperature and a stirring speed at the time of ripening.

It is preferable to provide, after ripening, a washing/dispersing step in which the ripened solution is washed with a mixed solution of water and a primary alcohol, in which a primary alcohol is added to the washed solution to cause nanoparticles to precipitate and in which the precipitates are dispersed in an organic solvent.

Impurities of the coating solution for forming the magnetic layer of the magnetic recording medium are removed and the coatability of the coating solution can be further improved by providing such a washing step.

The washing step is preferably conducted at least once and more preferably at least twice and the dispersion step is also preferably conducted at least once and more preferably at least twice.

The primary alcohol used in the washing step is not particularly limited and is preferably methanol, ethanol or the like. The mixing ratio (water/primary alcohol) by volume is preferably in a range from 10/1 to 2/1 and more preferably in a range from 5/1 to 3/1.

When the percentage of water is high, it may be difficult to remove the surfactant, whereas when the percentage of the primary alcohol is high, flocculation may take place.

Metal nanoparticles dispersed in a solution (metal nanoparticle liquid dispersion) can be thus obtained.

The metal nanoparticles are monodisperse in the invention. Therefore, when a coating solution including the above-described liquid dispersion is applied to a support, a coating layer in which these nanoparticles do not flocculate and are uniformly dispersed can be obtained. Accordingly, when the coating layer is annealed, metal nanoparticles do not coagulate in the layer, making it possible to transform the layer efficiently so as to have hard magnetism. Moreover, the coating solution including the liquid dispersion has a good coatability, as mentioned above.

The particle diameter of the metal nanoparticles before the annealing step is preferably 1 to 20 nm and more preferably 3 to 10 nm (the preferable diameter range of the metal nanoparticles obtained by a reduction method which will be explained later is the same as the diameter range described above). When used in a magnetic recording medium, the metal nanoparticles are preferably close-packed to improve recording capacity. For this, the coefficient of variation in the diameters of the metal nanoparticles of the invention is preferably less than 10% and more preferably 5% or less. When the particle size is too small, particles become paramagnetic because of thermal fluctuation. Although minimum stable particle diameter differs depending on structural elements, it is effective to select the mass ratio of $H_2O$ to the surfactant in synthesizing particles according to a desired particle diameter.

Reduction Method

A method in which a metal having a low redox potential (hereinafter may be called "base metal") such as Co, Fe, Ni and Cr and a metal having a higher redox potential (hereinafter may be called "precious metal") such as Pt, Pd and Rh are reduced with a reducing agent or the like in a liquid phase to precipitate metal nanoparticles is preferably used as a reduction method for preparing the metal nanoparticles.

At this time, there is no limitation as to which of the base metal or the precious metal should be reduced first and these base and precious metals may be reduced simultaneously.

Also, the transformation temperature at which the nanoparticles are transformed into a magnetically hard ordered alloy can be lowered by adding a third element such as Sb, Pb, Bi, Cu, Ag and Zn to the binary alloy, as in the above-mentioned reverse micelle method. The amount of the third element added is preferably 1 to 20 at % and more preferably 5 to 15 at % based on the total amount of the system.

For example, in the case of reducing the base metal and reducing the precious metal in this order to precipitate them, it is preferable to add a reducing agent having a redox potential lower than −0.2V (vs. N.H.E) to a solution including the base metal and the precious metal so as to reduce the base metal and a part of the precious metal, add the resultant solution to a precious metal source, add a reducing agent having a redox potential higher than −0.2 V (vs. N.H.E) to the resultant mixture and add a reducing agent having a redox potential lower than −0.2 V (vs. N.H.E) to the resultant mixture.

Although the redox potential depends on the pH of the system, alcohols such as 1,2-hexadecanediol, glycerols, $H_2$ and HCHO are preferably used as the reducing agent having a redox potential higher than −0.2 V (vs. N.H.E).

$S_2O_6^{2-}$, $H_2PO_2^-$, $BH_4^-$, $N_2H_5^+$ and $H_2PO_3^-$ are preferably used as the reducing agent having a redox potential lower than −0.2 V (vs. N.H.E). When a 0-valent metal compound such as iron carbonyl as the raw material of the base metal is used, the reducing agent for the base metal is unnecessary.

The metal nanoparticles can be formed stably by using an adsorbent at the time of reducing and precipitating the precious metal. A polymer or a surfactant is preferably used as the adsorbent. Examples of the polymer include polyvinyl alcohol (PVA), poly-N-vinyl-2-pyrrolidone (PVP) and gelatin. PVP is particularly preferable.

The molecular weight of the polymer is preferably 2,000 to 60,000 and more preferably 2,000 to 30,000. The amount of the polymer is preferably 0.1 to 10 times and more preferably 0.1 to 5 times as much as the mass of the magnetically hard metal nanoparticle to be produced.

The surfactant used as the adsorbent preferably contains an "organic stabilizer" which is a long-chain organic compound represented by the formula R—X. In the formula, R represents a "tail" group that is a linear or branched hydrocarbon or fluorocarbon chain and generally contains 8 to 22 carbon atoms. Also, X represents a "head group" which is a portion (X) providing a specific chemical bond to the surface of the nanoparticles and is preferably any one of a sulfinate (—SOOH), a sulfonate (—SO$_2$OH), a phosphinate (—POOH), a phosphonate (—OPO(OH)$_2$), a carboxylate and a thiol.

Metal nanoparticles dispersed in a solution (metal nanoparticle liquid dispersion) can be thus obtained.

A transmission electron microscope (TEM) can be used in order to measure the particle diameter of the prepared metal nanoparticles. Although the crystal system of the metal nanoparticles that has become magnetically hard by heating may be determined by electron beam diffraction using a TEM, X-ray diffraction is preferably used to determine the crystal system precisely. In order to analyze the composition of the inside of the metal nanoparticles which are magnetically hard, it is preferable to use an EDAX together with an FE-TEM in which an electron beam can be narrowed. The magnetic properties of the magnetically hard metal nanoparticles may be evaluated with a VSM.

The magnetic recording medium of the invention is produced by adding the above-mentioned matrix agent and optional additives to the above-mentioned metal nanoparticle liquid dispersion to prepare a coating solution for forming the magnetic layer, applying the coating solution to the support, and annealing the resultant coating layer to form the magnetic layer.

The content of the metal nanoparticles in the coating solution is preferably 5 to 50 mg/ml.

Also, it is preferable to use at least one matrix agent and the amount thereof is preferably 0.007 to 1.0 μg/ml and more preferably 0.01 to 0.7 μg/ml.

Also, a nonmagnetic layer may be disposed between the magnetic layer and the support and/or a back layer may be provided, if necessary. When the magnetic recording medium of the invention is, for example, a magnetic disk, it is preferable to dispose a magnetic layer and an optional nonmagnetic layer on the rear surface of the support. When the magnetic recording medium of the invention is a magnetic tape, a back layer is preferably disposed on the side of the support which side is opposite to the magnetic layer side. The nonmagnetic layer and the back layer may be either a sputtering film or a coating film.

Examples of the support used in the magnetic recording medium of the invention include inorganic materials and organic materials. The thickness of the support is preferably 3 to 800 μm.

Examples of inorganic materials used for the support include Al; Al—Mg alloys; Mg alloys such as Mg—Al—Zn; glass, quartz; carbon; silicon; and ceramics.

These supports have high impact resistance and also have rigidity which is suitable to the production of a thin support and to high speed rotation. Also, these supports have a heat resistance superior to that of organic supports.

Examples of organic materials used for the support include polyesters such as a polyethylene terephthalate and polyethylene naphthalate; polyolefins; cellulose triacetate; polycarbonates; polyamides (including aliphatic polyamides and aromatic polyamides such as aramides); polyimides; polyamidoimides; polysulfons; and polybenzoxazoles.

The dry thickness of the coating layer which is to be a magnetic layer is preferably 5 to 200 nm and more preferably 5 to 50 nm.

A plurality of magnetic layer coating solutions may be applied sequentially or simultaneously. The lower layer coating solution and the magnetic layer coating solution may be applied sequentially or simultaneously.

Examples of a method of applying the magnetic coating solution or the lower layer coating solution include air doctor coating, blade coating, rod coating, extrusion coating, air knife coating, squeeze coating, impregnation coating, reverse roll coating, transfer roll coating, gravure coating, kiss coating, cast coating, spray coating, and spin coating.

The metal nanoparticles which have just been produced by a liquid phase method or the like (metal nanoparticles in the metal nanoparticle liquid dispersion) are a disorder phase. Therefore, it is necessary to anneal the nanoparticles to obtain an ordered phase. Annealing is preferably carried out after the coating solution is applied to the support in order to prevent the particles from being fused.

It is necessary to measure, with differential thermal analysis (DTA), the alloy's transformation temperature at which the disordered metal nanoparticles comprising the alloy become ordered and to carry out annealing at a temperature higher than the transformation temperature. The transformation temperature of the metal nanoparticles varies according to the elemental composition of the nanoparticles and can be changed by inclusion of the above-described third element.

When an organic support is used, it is effective to use metal nanoparticles having a transformation temperature lower than the heat-resistant temperature of the support or to anneal only the magnetic layer using a pulse laser.

When the magnetic layer contains the metal oxide matrix, it not only has good adhesion to the support but also good anti-scratching properties. It is possible to improve wear resistance of the magnetic recording medium by forming a very thin protective layer on the magnetic layer and the wear resistance is further improved by applying a lubricant to the protective layer to improve lubricity, securing sufficient reliability.

Examples of the material of the protective film include oxides such as silica, alumina, titania, zirconia, cobalt oxide and nickel oxide; nitrides such as titanium nitride, silicon nitride and boron nitride; carbides such as silicon carbide, chromium carbide and boron carbide; and carbons such as graphite and amorphous carbon. Carbon protective films are preferable. Also, among carbon protective films, a film comprising hard amorphous carbon generally called diamond-like carbon is particularly preferable.

A sputtering method is usually used as a method of producing the carbon protective film in the case of a hard disk. Many methods using a plasma CVD which can provide a film at a higher speed are proposed in the case of products which need to form a film continuously, such as video tapes. Among these methods, a plasma injection CVD (PI-CVD) method is reported to be able to form a high quality protective film which is hard and has less pin holes at a very high speed (e.g., JP-A Nos. 61-130487, 63-279426 and 3-113824).

The carbon protective film is a hard carbon film having a Vickers hardness of at least 1,000 Kg/mm$^2$ and preferably at least 2,000 Kg/mm$^2$. Also, the crystal thereof has an amorphous structure and the film is nonconductive. When a diamond-like carbon film is used as the carbon protective film, a peak is detected at 1,520 to 1,560 cm$^{-1}$ in the case of using Raman light spectrum analysis, whereby it can be confirmed that the resultant film is a diamond-like carbon film. When the film structure deviates from the diamond-like structure, the peak detected by a Raman light spectrum analysis deviates from the above-described range and a film having a lower hardness is obtained.

Examples of a raw material used to produce the carbon protective film include a carbon-containing compound including an alkane such as methane, ethane, propane and butane; alkene such as ethylene and propylene; and alkyne such as acetylene. Also, a carrier gas, such as argon, and an additional gas, such as hydrogen and nitrogen, for improving film qualities may be added, if necessary.

When the carbon protective layer is thick, insufficient electromagnetic conversion characteristics and low adhesiveness of the protective film to the magnetic layer are obtained. On the other hand, when the layer is thin, wear resistance of the protective film is low. Therefore, the film thickness is preferably 2.5 to 20 nm and more preferably 5 to 10 nm.

A plurality of the magnetic layers may be provided to improve electromagnetic conversion characteristics and a nonmagnetic base layer and an intermediate layer can be provided.

A lubricant and/or a rust preventive agent is preferably applied to the magnetic layer or the protective layer of the magnetic recording medium of the invention to improve running durability and corrosion resistance.

Examples of the lubricant include known compounds such as hydrocarbon lubricants, fluorinated lubricants and extreme-pressure additives.

Examples of the hydrocarbon lubricant include carboxylic acids such as stearic acid and oleic acid; esters such as butyl stearate; sulfonates such as octadecylsulfonic acid; phosphates such as monooctadecyl phosphate; alcohols such as stearyl alcohol and oleyl alcohol; carboxylic acid amides such as stearic acid amide; and amines such as stearylamine.

Examples of the fluorinated lubricant include lubricants obtained by substituting a part or all of the alkyl groups of the aforementioned hydrocarbon lubricants with fluoroalkyl groups or perfluoropolyether groups.

Examples of the perfluoropolyether group include perfluoromethylene oxide polymers, perfluoroethylene oxide polymers, perfluoro-n-propylene oxide polymers $(CF_2CF_2CF_2O)_n$, perfluoroisopropylene oxide polymers $(CF(CF_3)CF_2O)_n$ and copolymers of these polymers. Also, compounds having a polar functional group such as a hydroxyl group, an ester group and a carboxyl group at at least one end thereof or in the molecule thereof are preferable because they are highly effective in reducing friction force. The molecular weight of the compound is preferably 500 to 5,000 and more preferably 1,000 to 3,000. When the molecular weight is less than 500, such a lubricant may have high volatility and lower lubricity. On the other hand, when the molecular weight exceeds 5,000, such a lubricant has high viscosity and a slider easily adheres to a disk, disk running is often interfered with or stopped, and head crash is easily caused.

Specific examples of the lubricant having the perfluoropolyether substituent include Fomblin™ commercially available from Ausimont Company and Krytox™ available from Du Pont.

Examples of the extreme-pressure additive include phosphates such as trilauryl phosphate, phosphites such as trilauryl phosphite, thiophosphites and thiophosphates such as trilauryl trithiophosphite and sulfur-containing extreme-pressure agents such as dibenzyl disulfide.

The aforementioned lubricants may be used alone or in combination. The lubricant is applied to the magnetic layer or the protective film by dissolving the lubricant in an organic solvent and applying the resultant coating solution to the magnetic layer or the protective film using a wire bar method, gravure method, spin coating method, dip coating method or the like or by depositing the lubricant using a vapor deposition method.

Examples of the rust preventive agent include nitrogen-containing hetero rings such as benzotriazole, benzimidazole, purine and pyrimidine and derivatives obtained by introducing an alkyl side chain into the above-described mother nucleus, hetero rings containing nitrogen and sulfur atoms such as benzothiazole, 2-mercaptonebenzothiazole, tetrazaindene cyclic compounds and thiouracil compounds and derivatives thereof.

When a backcoat layer (backing layer) is formed on the surface of the support on which surface a magnetic layer is not formed, it may be formed by dispersing a binder and granular components such as an abrasive and an antistatic agent in an organic solvent and applying the resultant coating solution to the support.

The granular components can be various inorganic pigments and carbon black. Examples of the binder include resins such as nitrocellulose, phenoxy resins, vinyl chloride resins and polyurethane. These resins may be used alone or in combination.

An adhesive layer may be formed on a support surface to which the nanoparticle liquid dispersion is applied and/or another support surface to which the coating solution for forming backcoat layer is applied.

The magnetic recording medium thus obtained may be punched or cut down to a desired size when used.

EXAMPLES

The invention will be described in more detail in accordance with examples, but is not limited to these examples.

Example 1

Synthesis of FePt Metal Nanoparticles

The following operations were carried out in highly pure $N_2$ gas.

An alkane solution obtained by mixing 10.8 g of Aerosol OT (manufactured by Wako Pure Chemical Industries, Ltd.), 80 ml of decane (manufactured by Wako Pure Chemical Industries, Ltd.) and 2 ml of oleylamine (manufactured by Tokyo Kasei Kogyo Co., Ltd.) was added to and mixed with an aqueous reducing agent solution obtained by dissolving 0.76 g of NaBH, (manufactured by Wako Pure Chemical Industries, Ltd.) in 24 ml of water (deoxygenation degree: 0.1 mg/l or less) to prepare a reverse micelle solution (I).

An alkane solution obtained by mixing 5.4 g of Aerosol OT and 40 ml of decane was added to and mixed with an aqueous metal salt solution obtained by dissolving 0.46 g of triammonium iron trioxalate ($Fe(NH_4)_3(C_2O_4)_3$) (manufactured by Wako Pure Chemical Industries, Ltd.) and 0.38 g of potassium chloroplatinate ($K_2PtCl_4$) (manufactured by Wako Pure Chemical Industries, Ltd.) in 12 ml of (deoxygenated) water to prepare a reverse micelle solution (II).

The reverse micelle solution (II) was added rapidly to the reverse micelle solution (I) which was stirred at a high speed at 22° C. with an Omni Mixer (manufactured by Yamato scientific Co., Ltd.). After ten minutes, the mixture was heated to 50° C. while stirred by a magnetic stirrer and was then ripened for 60 minutes.

2 ml of oleic acid (manufactured by Wako Pure Chemical Industries, Ltd.) was added to the mixture, and the resultant mixture was then cooled to room temperature. After cooling, the mixture was taken out in the atmosphere. In order to destroy reverse micelles, a mixed solution consisting of 100 ml of water and 100 ml of methanol was added to the mixture and the resultant mixture separated into an aqueous phase and an oily phase. Metal nanoparticles were contained and dispersed in the oily phase. The oily phase was washed five times with a mixed solution consisting of 600 ml of water and 200 ml of methanol.

Thereafter, 1100 ml of methanol was added to the washed oily phase to cause the metal nanoparticles to flocculate and settle. The supernatant was removed and 20 ml of heptane (manufactured by Wako Pure Chemical Industries, Ltd.) was added to the residue to redisperse the metal nanoparticles.

100 ml of methanol was added to the dispersion to cause the metal nanoparticles to settle, the supernatant was removed, and 20 ml of heptane was added to the residue to redisperse the metal nanoparticles. 100 ml of methanol was added to the dispersion to cause the metal nanoparticles to settle, the supernatant was removed, and 5 ml of heptane was added to the residue. A FePt metal nanoparticle liquid dispersion was thus prepared.

The yield, composition, number average particle diameter, distribution (coefficient of variation) and coercive force of the resulting metal nanoparticles were measured. The results are shown below.

Here, the composition and the yield were measured by ICP spectral analysis (inductive coupling high-frequency plasma spectral analysis).

The number average particle diameter and the distribution were determined by measuring diameters of particles from TEM photographs of the particles and statistically processing the measured diameters.

The coercive force was measured with a high-sensitive magnetization vector measuring device and a DATA processor which are manufactured by Toei Industry Co., Ltd. at an applied magnetic field of 790 kA/m (10 kOe). A portion of the metal nanoparticles were collected from the prepared metal nanoparticle liquid dispersion, sufficiently dried and heated in an electric furnace and the resultant nanoparticles were used in the measurement.

Composition: FePt alloy having a Pt content of 45.2 at %
Yield: 80%
Average particle diameter: 4.8 nm
Coefficient of variation: 5%
Coercive force (electric furnace temperature: 550° C., heating time: 30 minutes, heating was conducted in an argon gas atmosphere): 521.4 kA/m (6,600 Oe)

Formation of a Magnetic Layer

A silicon support having a thickness of 600 μm was burned to convert a part of silicon into $SiO_2$ to a depth of about 300 nm from the surface. A coating solution prepared by adding 5 vol % of a silicone resin (Torefil R910 manufacture by Toray Industries, Inc.) to the FePt metal nanoparticle liquid dispersion was spin-coated on the support. The amount of the coating solution was 0.4 g/m².

Further, the support was heated at 550° C. for 30 minutes in an argon gas atmosphere in an electric furnace to form a magnetic layer (film thickness: 50 nm) including the metal nanoparticles.

Formation of a Protective Film

The silicon support having the magnetic layer was placed in a plasma injection CVD apparatus manufactured by ASTeX Company such that the distance between the distal end of the reaction tube and the support was 22 mm.

Next, the vacuum vessel was evacuated such that the internal pressure was $399 \times 10^{-6}$ Pa and then 150 sccm of ethylene gas and 50 sccm of argon gas were introduced to the system from the gas introduction pipes such that the pressure in the reaction tube was 1.33 Pa. In this condition, a 13.56 MHz high-frequency wave was applied to the induction coil of the reaction tube at a power of 450 W to form a plasma of the raw gas (ethylene gas).

A bias voltage of −400 V was applied to the silicon support and a bias voltage of +500 V was applied to the anode electrode. A carbon protective film was formed such that the film thickness of the center portion was 10 nm.

Application of a Lubricant

A mixture of monolauryl phosphate and stearyl perfluorooctanate was spin-coated onto the carbon protective film in respective amounts of 3 mg/m$^2$. A magnetic recording medium was thus obtained.

The thickness of the protective layer and the lubricant layer was about 15 nm.

Example 2

A magnetic recording medium was produced in the same manner as in Example 1 except that the silicone resin in the coating solution for forming the magnetic layer was changed to 5 vol % of an organosilica sol (Nanotech SiO$_2$ manufactured by C. I. Kasei Co., Ltd.).

Example 3

A magnetic recording medium was produced in the same manner as in Example 1 except that the silicone resin in the coating solution for forming the magnetic layer was changed to 5 vol % of an organotitania sol (Nanotech TiO$_2$ manufactured by C. I. Kasei Co., Ltd.).

Comparative Example 1

A magnetic recording medium was produced in the same manner as in Example 1 except that the silicone resin was not added to the coating solution for forming the magnetic layer.

Evaluation of Film Strength

Each magnetic recording medium produced in Examples 1 to 3 and Comparative Example 1 was placed on a spin stand (SS-60 manufactured by Kyodo Denshi System Co., Ltd., Guzic RWA-1601) for evaluating the electromagnetic conversion characteristics of a hard disk and the film strength was evaluated by observing whether the film was easily scratched. The results are shown in Table 1.

The number of scratches was obtained by observing with an optical microscope whose magnification was 100 times three positions of the film which were at a radial distance of 40 to 60 mm from the center and by calculating the average.

Evaluation of Adhesion

In order to evaluate the adhesion between the support and the magnetic layer, a scratch of about 5 mm square was formed by a cutter in a region (S1) of the film having an area of 50 mm square, and then a polyester tape was applied to the film surface such that no air bubble was formed. The tape was peeled off rapidly and the area (S2) of the peeled portion of the film was measured and the ratio (S2/S1) was obtained. The results are shown in Table 1.

TABLE 1

| | Metal oxide Matrix agent | Scratches (Numer/mm$^2$) | Evaluation of adhesion (%) |
|---|---|---|---|
| Example 1 | Silicone resin | 0 | 0 |
| Example 2 | Organosilica sol | 1 | 0 |
| Example 3 | Organotitania sol | 1 | 0 |
| Comparative Example 1 | None | 14 | 29 |

As is clear from Table 1, film strength of a magnetic layer and adhesion between a magnetic layer and a support can be improved by forming a magnetic layer containing metal nanoparticles in a nonmagnetic metal oxide matrix.

Example 4

A magnetic recording medium was prepared in the same manner as in Example 1 except that the amount of the silicone resin was changed to 20% by volume.

Example 5

A magnetic recording medium was prepared in the same manner as in Example 1 except that the amount of the silicone resin was changed to 30% by volume.

The center line average roughness (a cut-off value of 0.25 mm) of the magnetic layer surface of each of the magnetic recording media of Examples 1, 4 and 5 and Comparative Example 1 was measured. Further, a check was made as to whether the head was broken (crushed) at the time of burnishing. The results are shown in Table 2. The surface property (Ra) of the magnetic layer was measured with 3D Milow manufactured by WYCO Inc.

TABLE 2

| | Ra (nm) | Head crash at the time of burnishing |
|---|---|---|
| Example 1 | 0.9 | Not crushed |
| Example 4 | 0.6 | Not crushed |
| Example 5 | 0.8 | Not crushed |
| Comparative Example 1 | 6 | Crushed |

Since the magnetic recording medium of Comparative Example 1 had a large Ra, a head crash occurred. On the contrary, in the case of the magnetic recording media of Examples 1, 4 and 5, no head crush occurred.

Examples 6 to 8

The magnetic recording media of Examples 6, 7 and 8 were prepared in the same manner as in Examples 1, 4 and 5, respectively except that the magnetic layer surfaces were burnished.

The number of projections on the magnetic layer surface of the magnetic recording media of Examples 1, 4 and 5 to 8, and Comparative Example 1, the contamination level of the glide head used, and the contamination level of the head capable of performing electromagnetic conversion (PEC head) which was used in evaluation were checked by using a stereomicroscope. The results are shown in Table 3.

TABLE 3

|  | Burnishing | Number of surface projections | Contamination level of glide head | Contamination level of PEC head |
|---|---|---|---|---|
| Example 1 | Not applicable | 10 | Soiled to some extent | Not soiled |
| Example 4 | Not applicable | 6 | Slightly soiled | Not soiled |
| Example 5 | Not applicable | 8 | Soiled to some extent | Not soiled |
| Example 6 | Conducted | 4 | Not soiled | Not soiled |
| Example 7 | Conducted | 2 | Not soiled | Not soiled |
| Example 8 | Conducted | 3 | Not soiled | Not soiled |
| Comparative Example 1 | Not applicable | At least 50 | Substantially soiled | — |

Further, a burnish head manufactured by Glide/Write, Inc. whose specification is as follows was used in burnishing.
Slider: 24 pads
Load: 5 g
Suspension: Type 2030
Z-height: 0.7366 mm (29 mil)

Further, a burnish head manufactured by Glide/Write, Inc. whose specification is as follows was used in the glide treatment (the number of projections on the surface).
Sensor: PZT
Load: 3.5 g
Suspension: Type T2
Z-height: 0.2032 mm (8 mil)
Flyheight: 12 nm From the results in Table 3, it is clear, according to the Examples, magnetic recording media could be obtained having no problems upon evaluation of electromagnetic conversion characteristics thereof. Further, it is also confirmed that, by carrying out burnishing in advance, magnetic recording media which soil a glide head less and have superior industrial aptitude can be provided.

What is claimed is:

1. A magnetic recording medium comprising a support and a magnetic layer containing, in a nonmagnetic matrix, metal nanoparticles having a CuAu-type or $Cu_3Au$-type magnetically hard ordered alloy phase, wherein an amount of the matrix is 1 to 50 vol % based on a total volume of the metal nanoparticles, wherein a center line average roughness of a magnetic layer surface is 0.1 to 5 nm at a cut-off value of 0.25 mm and wherein a number of projections on the magnetic layer surface having a height of at least 12 nm is no more than 5.

2. The magnetic recording medium of claim 1, wherein the magnetic layer surface is burnished such that the center line average roughness is in a range of 0.1 to 5 nm.

3. The magnetic recording medium of claim 1, wherein the nonmagnetic matrix is at least one matrix agent selected from the group consisting of silica, titania and polysiloxane.

4. The magnetic recording medium of claim 1, wherein the metal nanoparticles have a composition selected from the group consisting of FeNi, FePd, FePt, CoPt and CoAu.

5. The magnetic recording medium of claim 1, wherein the metal nanoparticles have a coercive force of 95.5 to 636.8 kA/m.

6. The magnetic recording medium of claim 1, further comprising a nonmagnetic layer between the support and the magnetic layer.

7. The magnetic recording medium of claim 1, further comprising a protective layer on the magnetic layer.

* * * * *